May 22, 1951 W. H. DIEZEL 2,554,095
FEEDING MECHANISM FOR GANG SLITTERS
Filed April 19, 1950 3 Sheets-Sheet 1
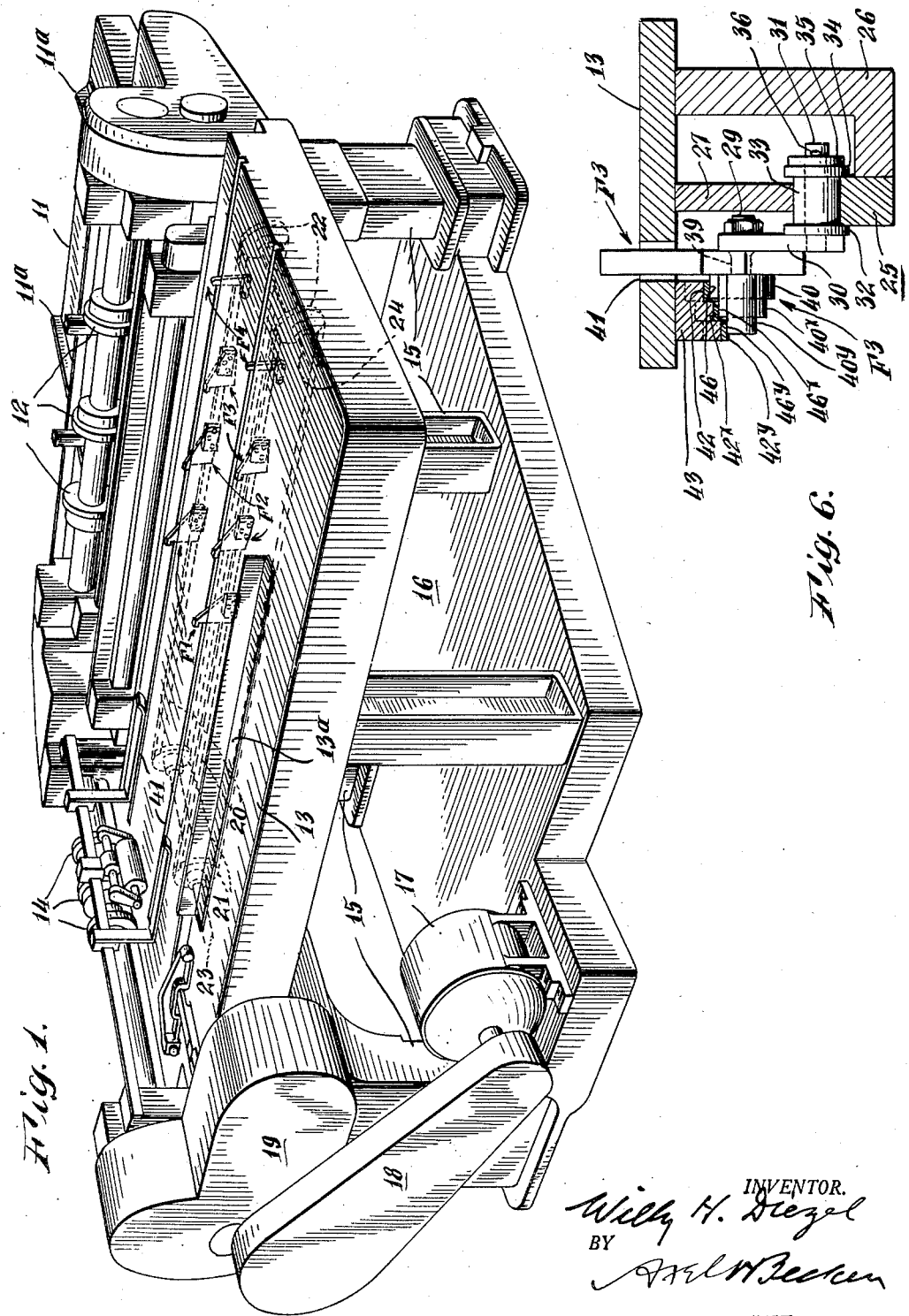

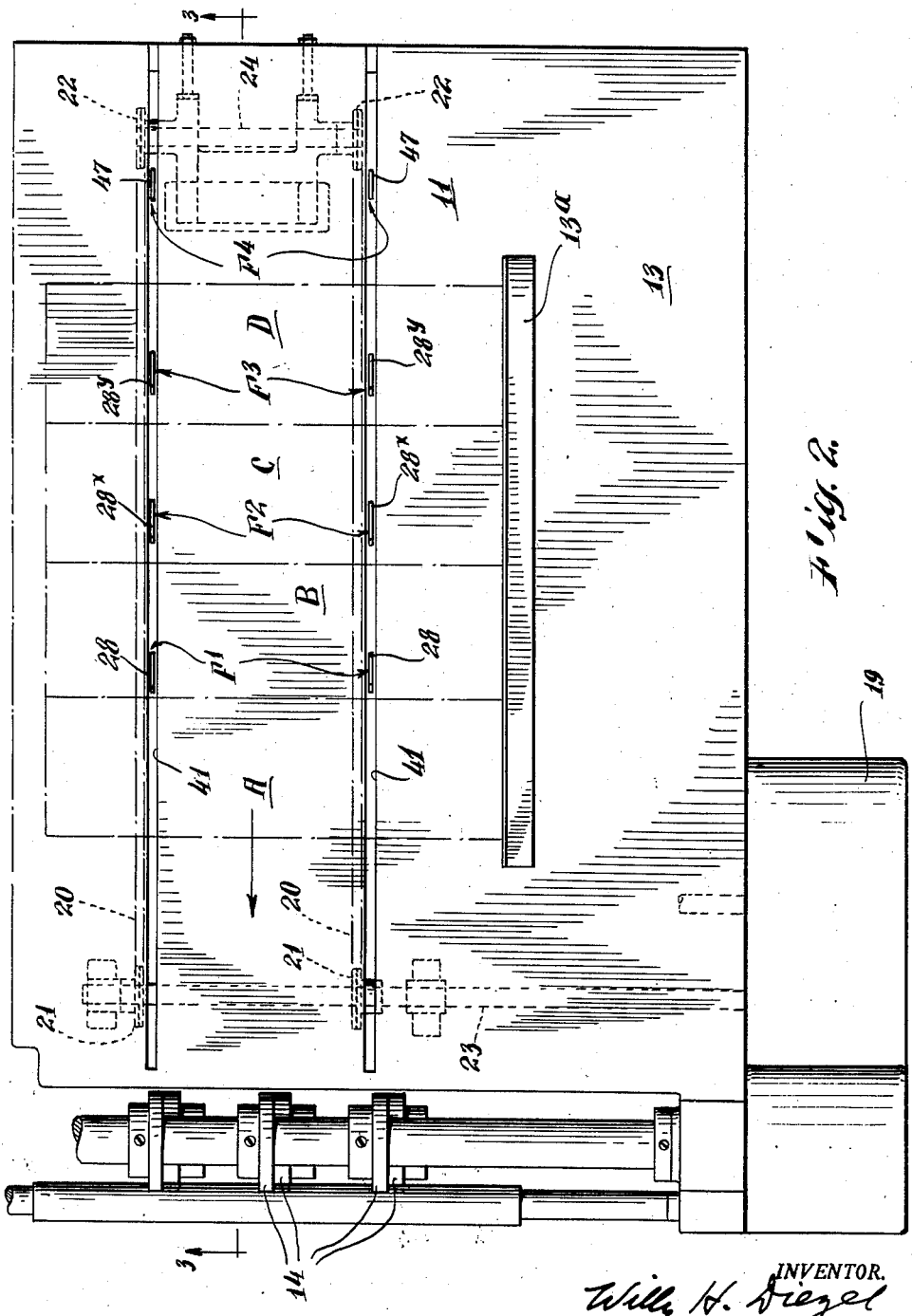

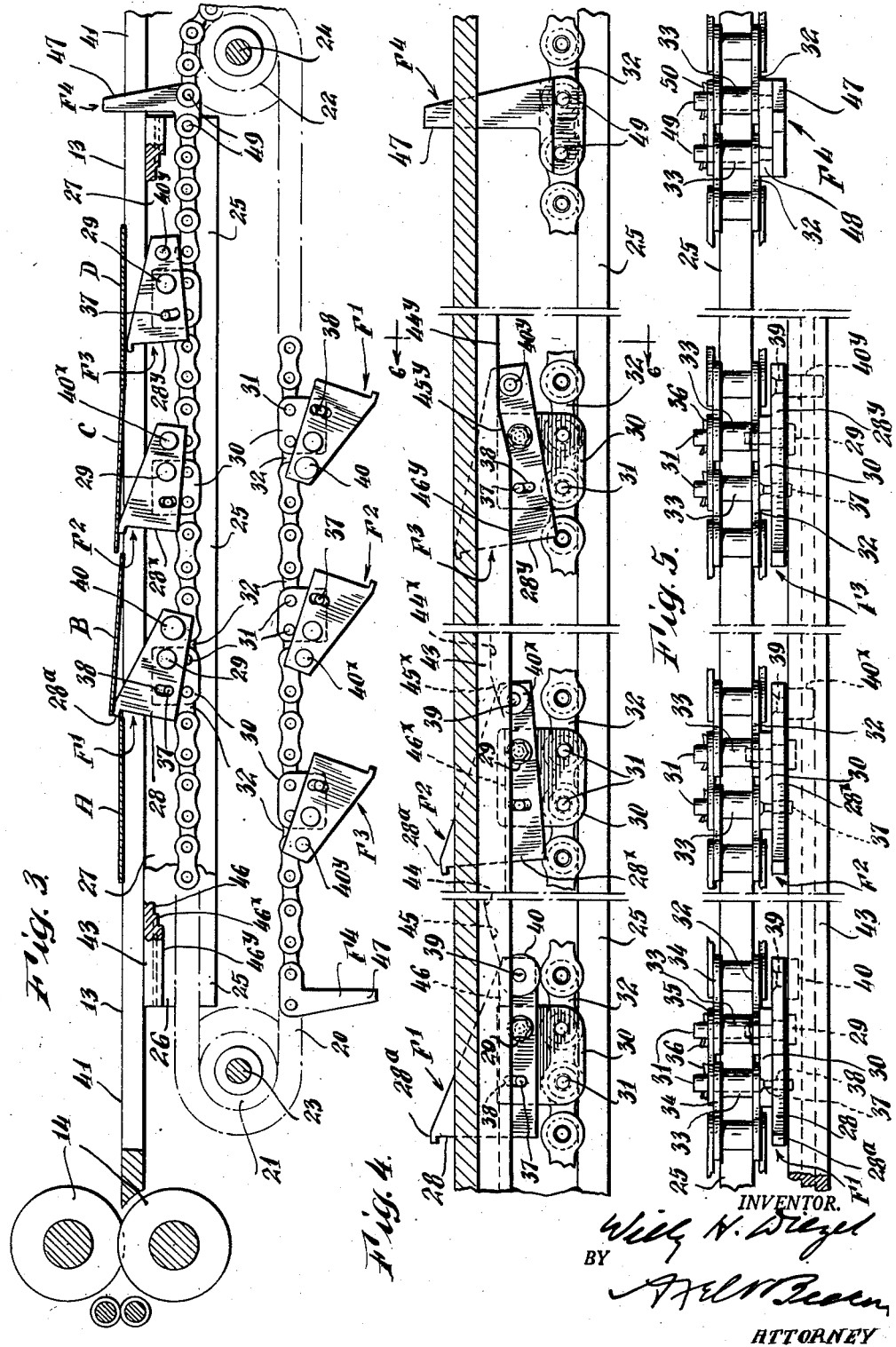

Patented May 22, 1951

2,554,095

UNITED STATES PATENT OFFICE 2,554,095

FEEDING MECHANISM FOR GANG SLITTERS

Willy H. Diezel, Fairfield, Conn., assignor to The Max Ams Machine Company, Bridgeport, Conn., a corporation of New York Application April 19, 1950, Serial No. 156,865

9 Claims. (Cl. 198—34)

This invention relates to improvements in apparatus for sequentially feeding plural pieces of sheet material to a machine for cutting or other processing; and, more particularly, is illustrated and described herein as embodied in a so-called "gang-slitter" which is employed to cut relatively large rectangular metal sheets into relatively small rectangular pieces of a size suitable for making tin cans such as are used in packaging food and other products.

It is common practice, in such gang-slitters, to first feed a large sheet horizontally in one direction between a set of opposed cutting rolls to cut the large single sheet into several smaller sheets of similar dimensions. These smaller sheets, upon emerging from the cutting rolls, are deposited upon a table in side-by-side positions. Then, in a second feeding stage, the several pieces are sequentially pushed or fed horizontally from said table, in a right-angular direction relatively to the first mentioned feeding movement, to a second set of opposed cutting rolls to cut them transversely relatively to the first cuts to reduce them to still smaller similar pieces of a size desired for use in making cans therefrom.

The present invention is concerned chiefly with improved means for feeding the sheets, in sequence, in the second feeding stage. It has been common practice, as a means to that end, to mount pivotal feeding pawls on a continuously driven endless chain at the underside of the table and to employ a reciprocating wedge or wedges to pivot each pawl upwardly through a slot in the table into horizontal pushing alignment with a sheet, to be pushed, resting upon the top of the table.

In such prior feeding mechanisms, the reciprocating wedge holds the pawl up only temporarily so that the only thing thereafter holding the pawl up, to enable it to continue pushing its related sheet, is a lip on the pawl which overlies the trailing edge of the sheet. If any slight irregularity of operation or some vibration should occur, the pawl may become disengaged from the trailing edge of its related sheet and drop down through the slot in the table, thereby causing the machine to become jammed up so that it would have to be stopped and readjusted. Such prior feeding apparatus also requires a special mechanism for reciprocating the wedges.

An important object of the present invention is the provision of improved feeding apparatus in which positive means, independent of the sheets being fed, are employed to hold up the pawl, thereby enhancing the machine's capacity to operate uninterruptedly.

Another important object of this invention is the provision of improved feeding apparatus in which feeding pawls are raised and held up without requiring any special operating mechanism for that purpose.

The foregoing and other objects are accomplished by this invention in its broader aspects, by mounting one or more sheet pushing pawls pivotally on an advancing pawl carrier disposed at the underside of a table, and by providing a fixed cam having a cam surface extending adjacent to the line of feeding movement of the pawl in position to coact with the latter to cause it to pivot upwardly through a slot in the table to push a sheet along the table top in response to its advancing movement; and the cam is so designed that its cam surface holds up the pushing pawl in pushing position during substantially the entire feeding movement of the sheet which it is pushing. Several such pivotal pawls may be and usually are disposed in series upon the pawl carrier, separate side-by-side arranged cams being provided for controlling the pivotal rising and holding of each of the pawls in the series. Usually, also, a non-pivotal pawl is fixed to the finger carrier in trailing position relatively to the pivoted fingers. This non-pivotal pawl normally extends above the top level of the table in position to engage and push a trailing sheet of a group.

Although the concept of the present invention may be embodied in various types of structures, nevertheless, for illustrative purposes, it has been considered sufficient to illustrate and describe in detail herein only one preferred embodiment of this invention without, however, limiting the invention to that specific embodiment.

In the drawings:

Fig. 1 is a perspective view of a machine embodying the present invention;

Fig. 2 is a top plan view of the near side of the machine as viewed in Fig. 1;

Fig. 3 is a vertical sectional view of the feeding mechanism in a second feeding stage, this view being on the line 3—3 of Fig. 2, various parts other than the feeding mechanism being omitted;

Fig. 4 is an enlarged view of the several feeding pawls shown in Fig. 3 and certain parts coacting directly with said pawls;

Fig. 5 is a plan view of the feeding pawls shown in Fig. 4; and

Fig. 6 is a fragmentary vertical sectional view, substantially on the line 6—6 of Fig. 4, the feeding assembly F³ being shown in its active position.

A machine embodying the present invention includes, as best seen in Fig. 1, a platform 11 from which a large sheet such as, for example, a metal sheet, in a first feeding operation, may be suitably fed forwardly between opposed adjustable guides 11a on the table and between several pairs of cutting rolls 12 (only the upper rolls thereof being visible in Fig. 1), to cut or slit the sheet in one direction into several sections. As shown in the drawings, three sets of rolls 12 are provided which will cut the sheet into four sections, but, if desired, additional rolls like 12 can be provided so as to trim the outer edges of the sheet simultaneously with cutting it into four sections. The four sections will emerge from rolls 12 and be deposited upon the top of a table 13 against a guide or stop 13a, which preferably is adjustably positioned upon the table.

These four sections or sheets, designated as A, B, C and D in Figs. 2 and 3, are then sequentially fed leftwardly on table 13 in a right-angular direction relatively to the first described feeding movement to pass them between a second several pairs of cutting rolls 14 of which only the upper rolls are visible in Fig. 1. The second group of cutting rolls 14 may be designed to cut the several sections or sheets A, B, C and D into any suitable number of smaller pieces. As illustrated, there are three pairs of rolls 14 adapted to cut each of the four sections or sheets A, B, C and D into four similar pieces; but, if desired, two additional rolls like 14 can be provided to trim the outer edges of sections A, B, C and D simultaneously with the slitting operation. The machine, as illustrated is suitable for converting the original single large sheet into sixteen relatively small pieces of a size suitable for further processing, to convert them into can-bodies. The small pieces pass from cutting rolls 14 to suitable receiving means which do not constitute any essential part of the present invention and which, therefore, are not shown in the drawings.

The mentioned platform, table, and cutting rolls are assembled in their proper relationship and mounted upon standards 15 suitably fixed upon a base 16. Also mounted on base 16 is a motor 17 which, through suitable transmission mechanism and gearing enclosed within casings 18 and 19, operates the cutting rolls in a manner well understood in the art.

The present invention is concerned chiefly with the means for sequentially feeding the plural sheets, such as sheets A, B, C and D which have emerged from cutting rolls 12 and have been deposited upon the top of table 13. In performing this operation, (sometimes referred to herein as the "second feeding operation"), it is desirable to first start moving sheet A leftwardly toward cutting rolls 14, then with a slight time lag, to start a similar movement of sheet B, then with a further slight time lag, to start similarly moving sheet C, and finally with a still further slight time lag, to start moving sheet D, thereafter, continuing such movement of all the sheets to cause them to approach and enter between cutting rolls 14 separately and in the stated sequence. According to the present invention, the particular means for so moving and feeding the several sheets A, B and C may be identical except as to dimensions of certain cams and cam pins as will hereinafter be more fully explained.

The means for moving the several sheets A, B, C, D, in the second feeding operation, include two similar endless chains 20 each supported upon and working around a sprocket-wheel 21 at the forward end of table 13 and a sprocket-wheel 22 at the rearward end of the table. Sprocket-wheels 21 are keyed or otherwise fixed upon a horizontal shaft 23 which is suitably supported at the underside of the table and extends transversely of the line of feeding movement to be given to sheets A, B, C, D. This shaft may be driven by motor 17 through suitable gearing and transmission means enclosed within casings 18 and 19. Sprocket-wheels 22 are mounted upon a transverse horizontal idler shaft 24 at the underside of the table, near the rear end thereof.

Under the described arrangement, chains 20 work in parallel vertical planes, and shaft 23 is driven counter-clockwise so that the upper run of the chain, which is nearest to the underside of the table, moves forwardly, i. e., toward cutting rolls 14. One or more groups (usually two groups) of pushing or feeding assemblies $F^1$, $F^2$, $F^3$, $F^4$ are fixed to each of chains 20 for pushing and feeding sheets A, B, C, D, so that, as those feeding elements move as a part of the upper run of the chain, they engage and feed the sheets sequentially toward cutting rolls 14.

It will be understood that a feeding arrangement designed to feed a group of sheets such as A, B, C, D sequentially must include feeding means which will move inactively past one or more of the rearward sheets in the group and become active for feeding only the foremost sheet in, or remaining in, the group. In view of the substantial similarity of the means for feeding all except the last sheet in a group, the following detailed description of the means for feeding sheet A will suffice also as a description of the principal characteristics of the means for feeding sheets B and C.

As chains 20 are somewhat flexible in a vertical plane, it is important to suppress such flexing in the upper run of the chains, which upper run performs the feeding of the sheets. For this purpose, an elongate supporting rail 25 is fixedly mounted, by suitable means such as a bracket 26, to table 13 or other stationary part of the machine in a position underlying the upper run of each chain and extending substantially from one to the other of the two sprocket-wheels which support the chain. Also, an elongate guide bar 27 is suitably fixed to the underside of the table in a position overlying the upper run of each chain and extending substantially from one to the other of the sprocket-wheels supporting the chain. The spacing between the lower surface of guide bar 27 and the upper surface of rail 25 is only slightly greater than the vertical dimension of the chain, hence, these two members effectively suppress any material flexing in the upper run of the chain.

First feeding assemblies $F^1$, for pushing or feeding first sheet A, are fixed to chains 20 in corresponding positions thereon so that, moving in unison, they will engage sheet A toward opposite ends of the trailing edge thereof to feed it along table 13 in a horizontal non-angular movement. Each feeding assembly $F^1$ includes a generally trapezoidal plate constituting a pawl 28, pivotally mounted, by a pivot bolt or pin 29, toward the top and rearward end of a rectangular plate constituting a pawl holder 30, for pivotal movement in a vertical plane. Pawl holder 30 may be substituted for and serve as an outer link member of chain 20 and is provided with a pair of pins 31 which are riveted toward the lower edge of the pawl holder and extend laterally therefrom through adjacent inner chain links 32 at one side of the chain, thence through related chain rollers 33 and then through inner and outer chain links 34, 35 respectively at the opposite side of the chain. The free ends of pins 31 extend beyond the mentioned outer link 35 and said pins are held, by cotter pins 36, in their described relationship as a part of the chain linkage.

The pivotal movement of pawl 28 is limited by a stop pin 37 which is riveted to pawl holder 30, toward the top and the forward end thereof, and extends within an arcuate slot 38 formed in the pawl. A cam pin 39 is riveted to the pawl, rearwardly of pivot pin 29, with a cam follower head 40 of said pin extending laterally from the pawl, at the side thereof remote from the related chain.

As the mechanism is so designed that pawl 28, when in active position, must extend above the top surface of table 13 and into horizontal alignment with a sheet to be fed, the table is formed with elongate slots 41 parallel to and above each of chains 20 and somewhat longer than the upper runs of said chains, these slots being in vertical alignment with the path of movement of the pawl. In one extreme position to which the pawl may be pivoted (hereinafter sometimes referred to as its "inactive position"), the pawl travels in its related slot 41, with its upper end below the top surface of the table. In the opposite extreme position to which the pawl may be pivotally moved, its upper end extends substantially above the top surface of the table in position to push a sheet resting thereon. Pivot pin 29 is located somewhat rearwardly of the center of gravity of the combined pawl with its cam pin so that, except as otherwise positively actuated, pawl 28 is in its inactive position during its travel at the upper run of the chain. Although such a normal inactive attitude of the pawl may result from the mentioned location of the pivot pin, nevertheless, that particular arrangement is not essential to the present invention as the pawl could be suitably spring-biased to its mentioned inactive position if desired.

Pawl 28 should be pivotally shifted to its active position at about the time it is passing beneath the forward portion of sheet B, so that, by the time the leading edge of the pawl is about to enter into pushing engagement with the rearward edge of sheet A, the upper end of the pawl will be in horizontal pushing alignment relative thereto. This pivotal movement of the pawl to its active position is derived from the coaction of cam follower head 40 with a cam surface on the underside of an elongate cam 42, held by a cam holder 43 which is suitably fixed to the underside of table 13. The mentioned cam surface has an upper horizontal portion 44 along which cam head 40 moves during the inactive position of the pawl, and an inclined portion 45 upon which the cam head slides to move pawl 28 toward and to its active position. Inclined portion 45 serves to guide the cam follower head from the mentioned upper cam surface portion 44 to a lower horizontal cam surface portion 46 which is of sufficient length to hold the pawl in its active position during substantially its entire remaining movement with the upper run of the chain. Thus, the cam functions as a positive means for holding the pawl in its active position until its feeding function has been completed. The upper forward end of pawl 28 preferably is provided with an overhanging lip $28^a$ which overlies the trailing margin of the sheet which it is pushing and operates to prevent the sheet from accidentally jumping over the pawl, to thereby prevent jamming of the machine.

Each successive pawl, as, for example, each of the next two successive pawls illustrated in the drawings for feeding sheets B and C, differs from its preceding pawl only in that its cam pin 39 has a cam follower head which extends laterally from the pawl somewhat more than the cam follower head of the preceding pawl and also is of smaller diameter than the cam follower head of the preceding pawl. Also, separate elongate cams are provided for coaction with the cam follower heads on each pawl for separately imparting pivotal movement thereto to their respective active positions at the proper time to enable them to function properly to feed their related sheets. Thus, the pawl $28^x$, intended for feeding sheet B, has a cam pin with a head $40^x$ which is of smaller diameter and extends laterally to a greater extent than head 40 on pawl 28 so that it underlies and coacts with an elongate cam $42^x$ which also may be secured to cam holder 43. Cam $42^x$ is similar to cam 42, except that its upper horizontal portion $44^x$ is at a lower level than upper portion 44 of cam 42 to about the extent that the diameter of follower head $40^x$ is less than the diameter of follower head 40; and lower horizontal portion $46^x$ of cam $42^x$ is similarly lower than lower horizontal portion 46 of cam 42. Inclined portion $45^x$ of cam $42^x$ is in such a position relatively to the line of movement of pawl $28^x$ that it functions to move the latter from its inactive to its active position while said pawl is moving underneath the forward portion of sheet C, and to so time the latter movement that the forward portion of pawl $28^x$ will enter into abutting pushing relationship with sheet B shortly after pawl 28 has commenced pushing sheet A.

A third pivotal pawl $28^y$, provided for pushing sheet C, differs from described pawls 28 and $28^x$ only in that its cam follower head $40^y$ extends laterally of the pawl to an extent even greater than the lateral extension of follower head $40^x$ and in that follower head $40^y$ is of less diameter than follower head $40^x$. Also, an elongate cam $42^y$, with which follower head $40^y$ coacts for pivoting pawl $28^y$, is similar to cams 42 and $42^x$, except that it has its upper portion $44^y$ and its lower portion $46^y$ lower respectively than portions $44^x$ and $46^x$ of cam $42^x$ in the same sense as the last-mentioned cam portions are lower than corresponding cam portions of cam 42. Inclined portion $45^y$ of cam $42^y$ is so positioned relatively to the line of movement of pawl $28^y$ on the upper run of the chain that it will function to pivot pawl $28^y$ from its inactive to its active position while it is moving underneath the forward portion of sheet D, and will cause the forward end of the latter pawl to rise into horizontal pushing alignment with, and to abut, the rearward edge of sheet C shortly after pawl $28^x$ has commenced pushing sheet B.

From the foregoing description, it will be understood that there preferably is a time lag in the commencement of pushing of sheets B and C relatively to each immediately preceding sheet. Because of the described differences in the lateral extensions and the diameters of the several cam follower heads on the different pawls, and because of the different levels of the upper and lower portions of the several mentioned cam surfaces, it will be understood that each of the cam follower heads is entirely free of any coaction with any cam surface excepting the particular cam with which it is intended to coact. Hence, each of the cams functions to move its related pawl entirely independently of, but nevertheless, in proper timed relation to the other pawls, this timed relation resulting from the differences in locations of the inclined portions of said cams along the line of feeding movement.

The means for feeding the last sheet D of the group does not have to pass underneath any following sheet and, therefore, it is not necessary to provide a pivotal pawl for that purpose. Instead, it is sufficient to provide a non-pivotal plate constituting an upstanding feeding pawl or finger 47 having, at its lower end, an integral horizontal arm 48, to one side of which are riveted two pins 49 which extend transversely through the chain, as a part of the linkage thereof, to hold finger 47 to the chain in the same manner that pins 31 are employed for mounting pawl holder 30 thereon. The pins 49 similarly are held against unintended dislodgement from the chain by cotter pins 50. Similar fingers 47 are mounted in corresponding positions on the two chains 20 and, like pawls 28, these fingers also move within slots 41 when on the upper run of the chain, and extend above the table top in horizontal alignment with the last plate D of the group so that it will engage and push the latter toward, and feed it into, cutting rolls 14. Preferably, the spacing between finger 47 and the preceding pivotal pawl is such as to cause feeding of the last sheet D of the group with about the same time lag relatively to the preceding sheet as has already been described with reference to the first several sheets in the group.

As the several feeding pawls and fingers and the cams associated with the two chains are similarly disposed in relation thereto, and as the two chains are constrained to run in step with each other, all the sheets are fed in a straight-line, non-angular movement into cutting rolls 14. Also, the various mentioned guides, cams and cutting rolls may be adjusted or changed, and the several feeding pawls and fingers may be shifted to different positions on the chains to adapt the machine for slitting sheets of different sizes or to cut large sheets into a greater or lesser number of small sheets.

In the operation of the machine, it may be assumed that motor 17 is placed in continuous operation whereby to continuously operate cutting rolls 12 and 14, the two latter groups of rolls being operatively interconnected by bevel gearing (not shown); and that the motor also is continuously driving shaft 23 and sprocket-wheels 21 thereon so that chains 20 are continuously moving over and around sprocket-wheels 21, 22 and, of course, carrying the group or several similar groups of pivotal and non-pivotal pawls therewith. With the machine thus running, a large sheet or plate, which may be of tin, sheet steel or other sheet metal or other sheet material, is fed forwardly on platform 11 between cutting rolls 12 by any suitable means. This feeding should be in timed relationship to the movement of the group or groups of pawls on chains 20 so that the first cuts will be completed by cutting rolls 12 and the resultant plural sheets A, B, C, D will emerge therefrom and be deposited upon table 13, at least just before the first pivotal pawls 28 commence rising to active positions.

After sheets A, B, C and D have been deposited upon table 13, pivotal pawls 28, 28$^x$, 28$^y$ rise in sequence, contacting the undersides of forward portions of the immediately overlying sheets and sliding thereunder and tilting them upwardly at their forward ends so that said pawls, respectively, commence pushing sheets A, B and C in a lagging sequence in the manner already described; and upstanding feeding finger 47 feeds the last sheet D of the group to follow immediately after preceding sheet C. Thus, sheets A, B, C, D are fed sequentially into cutting rolls 14 by which each of said sheets is cut into plural smaller sheets. The feeding function of each feeding pawl is completed by the time it reaches the forward end of the upper run of the chain, whereupon the pawl passes with the chain around sprocket-wheel 21, thence back along the lower run of the chain and over sprocket-wheel 22 to the upper run of the chain to function again in another feeding operation such as has just been described.

It is understood that the chains may be equipped with at least two groups of feeding pawls, and that, while one group of pawls is functioning as feeding means at the upper run of the chain, another group is being carried rearwardly at the lower run of the chain to initiate a further feeding operation at the upper run of the chain. Thus, if two such groups of feeding pawls are provided, they function alternately upon successive groups of sheets to be fed into rolls 14.

It may be seen from the foregoing description that the pivotal feeding means, according to this invention, are positively held in their raised or feeding positions during the entire period of pushing of the related sheets into rolls 14. In this respect, among others, the present invention is considered to be a substantial improvement over prior feeding structures wherein pivotal feeding fingers are positively held only momentarily in their active or feeding positions. It may be seen, also, that the present feeding means do not require any special wedge actuating means for raising them to active positions; thus, a feeding mechanism according to this invention is simpler and less costly to construct than prior mechanisms and is less likely to get out of order.

I claim:

1. Sheet feeding apparatus comprising a table for supporting a group of sheets in predetermined positions thereon in a line corresponding to the intended line of feeding thereof, a pawl carrier associated with the table adjacent to and movable in parallelism with said line, a cam in fixed association with the table and having a cam surface extending adjacent to said carrier and generally parallel to said line, a pawl, pivotally carried by the pawl carrier for engaging and feeding a sheet other than the last sheet of said group, and having a cam follower portion coacting with the said cam surface, upon movement of the carrier, at a time when said finger has passed at least a part of the last sheet of said group, to pivot the finger from an inactive position in non-alignment horizontally with said other sheet on the table to an active position in horizontal alignment with said other sheet, and a second pawl carried by said carrier in a trailing position relatively to said pivotal pawl for engaging and feeding the last sheet of the group.

2. Sheet feeding apparatus according to claim 1, further characterized in that the pawl carrier is an endless flexible element having an active portion which is continuously movable in the intended direction of feeding.

3. Sheet feeding apparatus according to claim 2, further characterized in having a pair of said flexible elements, the active portions of which are adapted to move in unison in substantial parallelism.

4. Sheet feeding apparatus according to claim 1, further characterized in that the pawl carrier is an endless flexible element having an active portion closely underlying the table and continuously movable in the intended direction of feeding, and in that the table is formed with an elongate slot through which said pawls extend into horizontal feeding alignment with sheets on the table.

5. Sheet feeding apparatus according to claim 4, further characterized in that the flexible element is arranged to move in a vertical plane and is flexible in a vertical plane, and in including a rail and a guide bar, respectively fixed under and over the active portion of the flexible element for preventing material flexing of said active portion.

6. Sheet feeding apparatus according to claim 1, further characterized in including two or more of such pivotal pawls in spaced relationship on said pawl carrier in advance of the mentioned second pawl, and a separate cam surface for coacting independently with each pawl, disposed in such positions along the line of movement of the pawl carrier as to pivot said pawls in sequence to active positions.

7. In sheet feeding apparatus, the combination of a continuously movable flexible element having an active portion movable in the general direction of intended feeding, plural feeding pawls mounted on said element for pivotal movement between normally inactive non-feeding positions and active feeding positions, and separate fixed cams each in position to intercept and coact independently with a part of a different one of said pawls, during the movement of the pawls with the flexible element, to pivot the pawls to their active positions; the said cams being fixed in such positions relatively to the linear movement of the pawls as to actuate the latter in sequence to their said active positions.

8. The combination according to claim 9, further characterized in that the said cams are arranged in side by side positions extending along and adjacent to the line of feeding movement of said pawls with their pawl pivoting portions at different levels and that the pawls have cam follower portions at correspondingly different levels, which cam follower portion, on each pawl, extends laterally to an extent sufficient to bring it into vertical alignment and operating engagement with its corresponding cam without interference with any other cam.

9. Sheet feeding apparatus comprising a table for supporting a group of sheets, in predetermined positions thereon, in a line corresponding to the intended line of feeding thereof, and being formed with a pair of elongate slots parallel to said line and underlying such predetermined sheet positions toward opposite sides thereof, a pair of endless flexible elements supported underneath the table and constrained to move linearly in unison, with active runs of said elements extending parallel to said slots, plural feeding pawls pivotally mounted in corresponding spaced positions on said flexible elements, separate similar sets of cams disposed adjacent the lines of movement of said pawls on the active runs of each flexible element, each set of cams having separate surfaces arranged to coact independently with a different related one of the pawls during the latter's movement at the active run of its related flexible element, to pivot that pawl from a normal inactive position below the table top to an active position in which a portion of the pawl extends through a related one of said slots and above the table top in position to engage and feed a sheet thereon, and a non-pivotal feeding pawl fixed to each of said flexible elements in spaced trailing relationship relatively to said pivotal pawls, and having a portion which, at the active run of said element extends through a related slot and above the table top in position to feed a last sheet of a group on the table.

WILLY H. DIEZEL.

REFERENCES CITED

The following references are of record in the file of this patent:

UNITED STATES PATENTS

| Number | Name | Date |
|---|---|---|
| 300,247 | Gordon | June 10, 1884 |
| 1,865,337 | Rose | June 28, 1932 |
| 2,187,026 | Hamachek | Jan. 16, 1940 |
| 2,480,253 | Malhiot | Aug. 30, 1949 |
| 2,546,072 | Kemp | Mar. 20, 1951 |